(12) United States Patent
Brenner et al.

(10) Patent No.: US 9,593,962 B2
(45) Date of Patent: Mar. 14, 2017

(54) SYSTEMS AND METHODS FOR ATTITUDE FAULT DETECTION BASED ON INTEGRATED GNSS/INERTIAL HYBRID FILTER RESIDUALS

(71) Applicant: Honeywell International Inc., Morristown, NJ (US)

(72) Inventors: Mats Anders Brenner, Plymouth, MN (US); Mark A. Ahlbrecht, Champlin, MN (US); John R. Morrison, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 497 days.

(21) Appl. No.: 14/564,359

(22) Filed: Dec. 9, 2014

(65) Prior Publication Data

US 2016/0290826 A1 Oct. 6, 2016

Related U.S. Application Data

(60) Provisional application No. 62/061,413, filed on Oct. 8, 2014.

(51) Int. Cl.
*G01C 23/00* (2006.01)
*B64D 47/00* (2006.01)
(Continued)

(52) U.S. Cl.
CPC ........... *G01C 23/005* (2013.01); *B64D 47/00* (2013.01); *G05D 1/0808* (2013.01); *G07C 5/0808* (2013.01)

(58) Field of Classification Search
CPC .... G01C 23/005; B64D 47/00; G05D 1/0808; G07C 5/0808
(Continued)

(56) References Cited

U.S. PATENT DOCUMENTS 4,914,598 A 4/1990 Krogmann et al.
5,841,537 A 11/1998 Doty
(Continued)

FOREIGN PATENT DOCUMENTS

WO 0042482 7/2000

OTHER PUBLICATIONS

U.S Patent and Trademark Office, "Notice of Allowance and Fee(s) Due", Jan. 29, 2016, pp. 1-17, Published in: US.
(Continued)

*Primary Examiner* — McDieunel Marc
*Assistant Examiner* — James E Stroud
(74) *Attorney, Agent, or Firm* — Fogg & Powers LLC

(57) ABSTRACT

Systems and methods for attitude fault detection based on integrated GNSS/inertial hybrid filter residuals are provided. In one embodiment, a fault detection system for aircraft attitude measurement system comprises: a sensor monitor coupled to a first inertial measurement unit, the sensor monitor comprising: a navigation error model for the first inertial measurement unit, the model configured to model a plurality of error states including at least an attitude error state vector, an velocity error state vector, and a position error state vector determined from data generated by the first inertial measurement unit; and a propagator-estimator configured to propagate and update error states based on GNSS data; and a residual evaluator configured to input measurement error residual values generated by the propagator-estimator, wherein the residual evaluator outputs an alert signal when the measurement error residual values exceed a threshold.

20 Claims, 4 Drawing Sheets

(51) Int. Cl.
*G07C 5/08* (2006.01)
*G05D 1/08* (2006.01)

(58) Field of Classification Search
USPC .............................................. 701/7
See application file for complete search history.

(56) References Cited

U.S. PATENT DOCUMENTS

| | | | |
|---|---|---|---|
| 6,094,608 | A | 7/2000 | Bomans et al. |
| 6,782,742 | B1 | 8/2004 | Adebjork et al. |
| 7,587,277 | B1 | 9/2009 | Wells |
| 8,010,308 | B1 | 8/2011 | Churchill |
| 8,275,544 | B1 | 9/2012 | Wells et al. |
| 8,311,739 | B2 | 11/2012 | Huddle |
| 8,682,507 | B2 | 3/2014 | Ezerzere et al. |
| 2003/0016145 | A1 | 1/2003 | Bateman |
| 2004/0027570 | A1 | 2/2004 | Caldwell et al. |
| 2005/0114023 | A1 | 5/2005 | Williamson et al. |
| 2008/0269963 | A1 | 10/2008 | Vos et al. |
| 2013/0197724 | A1 | 8/2013 | Ellis |
| 2013/0325245 | A1 | 12/2013 | Kolcarek et al. |
| 2014/0240147 | A1 | 8/2014 | Goda et al. |
| 2015/0097706 | A1 | 4/2015 | Perger et al. |
| 2015/0253150 | A1 | 9/2015 | Guillet et al. |
| 2016/0102994 | A1* | 4/2016 | Brenner ............... G05D 1/0077 701/7 |

OTHER PUBLICATIONS

European Patent Office, "European Search Report", "from foreign counterpart of U.S Appl. No. 14/564,359", Mar. 1, 2016, pp. 17, Published in: EP.

European Patent Office, "Extended European Search Report", "from foreign counterpart of U.S. Appl. No. 14/564,344," Feb. 25, 2016, pp. 18, Published in: EP.

U.S. Patent and Trademark Office, "Notice of Allowance", "U.S. Appl. No. 14/564,344", May 16, 2016, pp. 1-11.

Lundberg et al., "Synthetic Attitude and Heading Reference for Saab Gripen", "Proceedings of the 39th IEEE Conference on Decision and Control", Dec. 2000, pp. 2040-2043, Publisher: IEEE, Published in: Sydney, Australia.

Sabatini, "Quaternion-Based Extended Kalman Filter for Determining Orientation by Inertial and Magnetic Sensing", "IEEE Transactions on Biomedical Engineering", Jun. 19, 2006, pp. 1346-1356, vol. 53, No. 7.

* cited by examiner

SYSTEMS AND METHODS FOR ATTITUDE FAULT DETECTION BASED ON INTEGRATED GNSS/INERTIAL HYBRID FILTER RESIDUALS

CROSS-REFERENCE TO RELATED APPLICATIONS

This application claims priority to, and the benefit of, U.S. Provisional Application No. 62/061,413 entitled "SYSTEMS AND METHODS FOR ATTITUDE FAULT DETECTION BASED ON INTEGRATED GNSS/INERTIAL HYBRID FILTER RESIDUALS" which was filed on Oct. 8, 2014 and which is herein incorporated by reference in its entirety.

BACKGROUND

Current commercial aircraft designs are drawn to eliminating the need for having three operable high-grade (i.e., navigation grade) air-data inertial measurement units for obtaining aircraft attitude measurements. The desire is to have an aircraft that includes only two high-grade inertial measurement units, and have a third unit that may be a low-grade inertial sensor, such as a micro-electromechanical (MEMS) inertial sensor. At the same time, there is a desire to maintain the capability for the aircraft to take-off, even when one of the two high-grade inertial measurement units is out-of-service (for example, due to an inertial sensor fault). Take-off and operation of an aircraft with two reliable sources for attitude measurements is not problematic in itself, but a situation can develop where one of the two remaining in-service inertial sensors degrades during flight and begins to output attitude data that includes some level of bias error. In that case, when the flight crew observes that the two in-service inertial sensors are producing differing roll and/or pitch data, they need to be able to determine which of the sensors is providing accurate attitude measurements and which is not.

For the reasons stated above and for other reasons stated below which will become apparent to those skilled in the art upon reading and understanding the specification, there is a need in the art for alternate systems and methods for attitude fault detection based on integrated GNSS/inertial hybrid filter residuals.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

SUMMARY

Figure 1:
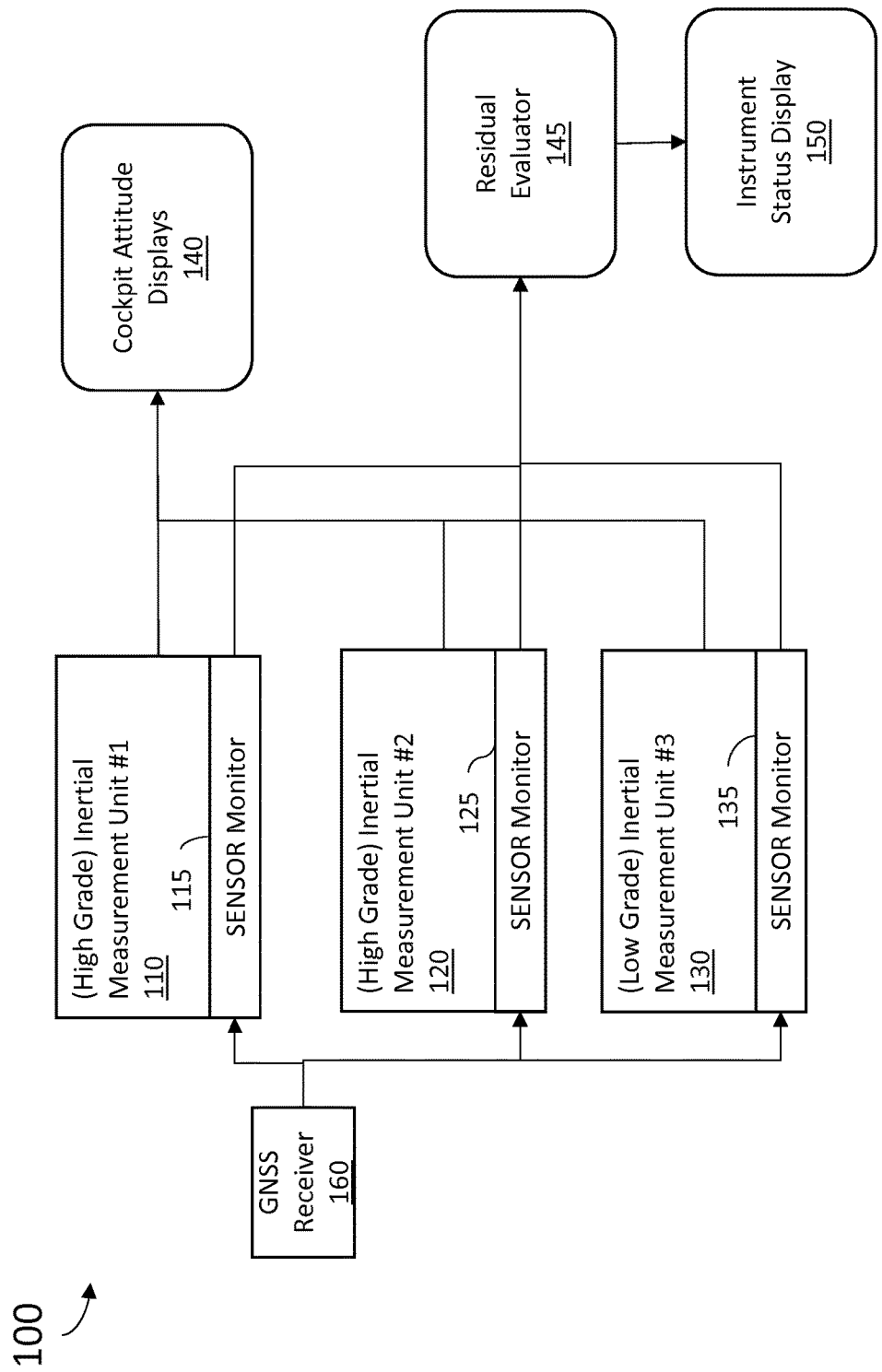
FIG. 1 is a diagram illustrating an avionics system for providing aircraft attitude measurements of one embodiment of the present disclosure.

The Embodiments of the present invention provide methods and systems for providing attitude fault detection and will be understood by reading and studying the following specification.

Systems and methods for attitude fault detection based on integrated GNSS/inertial hybrid filter residuals are provided. In one embodiment, a fault detection system for aircraft attitude measurement system comprises: a sensor monitor coupled to a first inertial measurement unit of the aircraft attitude measurement system, the sensor monitor comprising: a navigation error model for the first inertial measurement unit, the navigation error model configured to model a plurality of error states including at least an attitude error state vector, an velocity error state vector, and a position error state vector determined from data generated by the first inertial measurement unit; and a propagator-estimator configured to propagate and update the plurality of error states from the navigation error model based on GNSS data; and a residual evaluator configured to input measurement error residual values generated by the propagator-estimator, wherein the Residual Evaluator outputs an alert signal when the measurement error residual values exceed a predetermined statistical threshold.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The proposed embodiments described herein determine when there is a pitch or roll error in the attitude output of an inertial measurement unit that provides both pure inertial and GNSS/inertial blended solutions. The blended solution or hybrid solution is obtained by implementing a Kalman filter or Kalman filter equivalent propagator-estimator referred to as a hybrid filter. The hybrid filter function indirectly checks the consistency of the output navigation parameters such as roll and pitch. This is achieved by constantly evaluating the filter residuals for all used GNSS measurements versus a threshold set based on the expected noise level. With embodiments of the present disclosure, this type of residual screening is utilized to detect faults in inertial system outputs. In some embodiments, roll and pitch angles in the range 5-10 degrees cause these residual tests to exceed their threshold before the roll or pitch goes beyond the allowed range which means that a similar (but not equal) scheme can be used as a pitch and roll error detector as well. Conflicts appear as a systematic offsets in the hybrid propagator-estimator measurement residuals such that they reach a level that is beyond the uncertainty of the measured parameters. Thresholds can be applied to the residuals so that attitude errors greater than predetermined levels trigger an alert. For example, in one embodiment a component evaluating the residuals from an inertial measurement unit can determine if roll is off (e.g., by more than 10 degrees) or pitch is off (e.g., by more than 5 degrees) or if both pitch and roll are off for the navigation device. Further, when two independent inertial measurement units begin to output different attitude solutions, the proposed embodiments can look at residual levels for each of the available inertial sensor units and indicate which system is generating and attitude solution in error.

FIG. 1 is a diagram illustrating an avionics system 100 for providing aircraft attitude measurements (i.e., aircraft pitch and roll measurements) to the aircraft's flight crew. The system includes three inertial measurement units 110, 120 and 130. In the particular embodiment shown in FIG. 1, system 100 includes a first high-grade inertial measurement unit (110) and a second high-grade inertial measurement unit (120) and further includes a low-grade inertial measurement unit (130) which may be implemented using an MEMS inertial sensor, for example. However, system 100 need not be limited to this particular configuration. In other embodiments, the inertial measurement units may all be high-grade, all low-grade, all different grades, or any combination thereof. Further, in alternate embodiments, system 100 may comprise more than, or less than, 3 inertial measurement units. The three inertial measurement units 110, 120 and 130 each output data to one or more cockpit attitude displays 140 that provide aircraft attitude measurement information to the flight crew.

As illustrated in FIG. 1, with embodiments of the present disclosure, each of the inertial measurement units 110, 120 and 130 has an associated sensor monitor (shown at 115, 125 and 135) that identifies when attitude data from its inertial sensor is suspect or failed. This determination is made by each respective sensor monitor based on residuals from a hybrid filter (optimal or suboptimal propagator-estimator) that inputs inertial data from its associated inertial measurement unit and Global Navigation Satellite System (GNSS) data. The GNSS data may be derived, for example from satellite navigation signals received by the aircraft's GNSS receiver 160. In one embodiment, GNSS receiver 160 comprises a Global Positioning System (GPS) receiver. Inertial data includes attitude, velocity, and position data as well as accelerations and angular rates. The GNSS data derived from satellite navigation signals may be either pseudo ranges, which is the measured range to the satellite combined with the clock offset in the receiver (multiplied by the speed of light), GNSS based position data or GNSS based velocity data.

Using outputs from the sensor monitors 115, 125 and 135, a Residual Evaluator 145 generates an alarm displayed on an instrument status display 150 when it determines that a fault has occurred. The sensor monitors 115, 125 and 135 may be integral to the inertial measurement units 110, 120 and 130 as shown in FIG. 1. Alternatively, in other embodiments, the sensor monitors 115, 125 and 135 may be implemented externally from the inertial measurement units 110, 120 and 130. For example, in one embodiment, the sensor monitors 115, 125 and 135 may be implemented within the avionics equipment responsible for the cockpit attitude displays 140, or for the instrument status display 150. In other embodiments, the sensor monitors 115, 125 and 135 may be integrated into a common avionics component with the residual evaluator 145.

Figure 2:
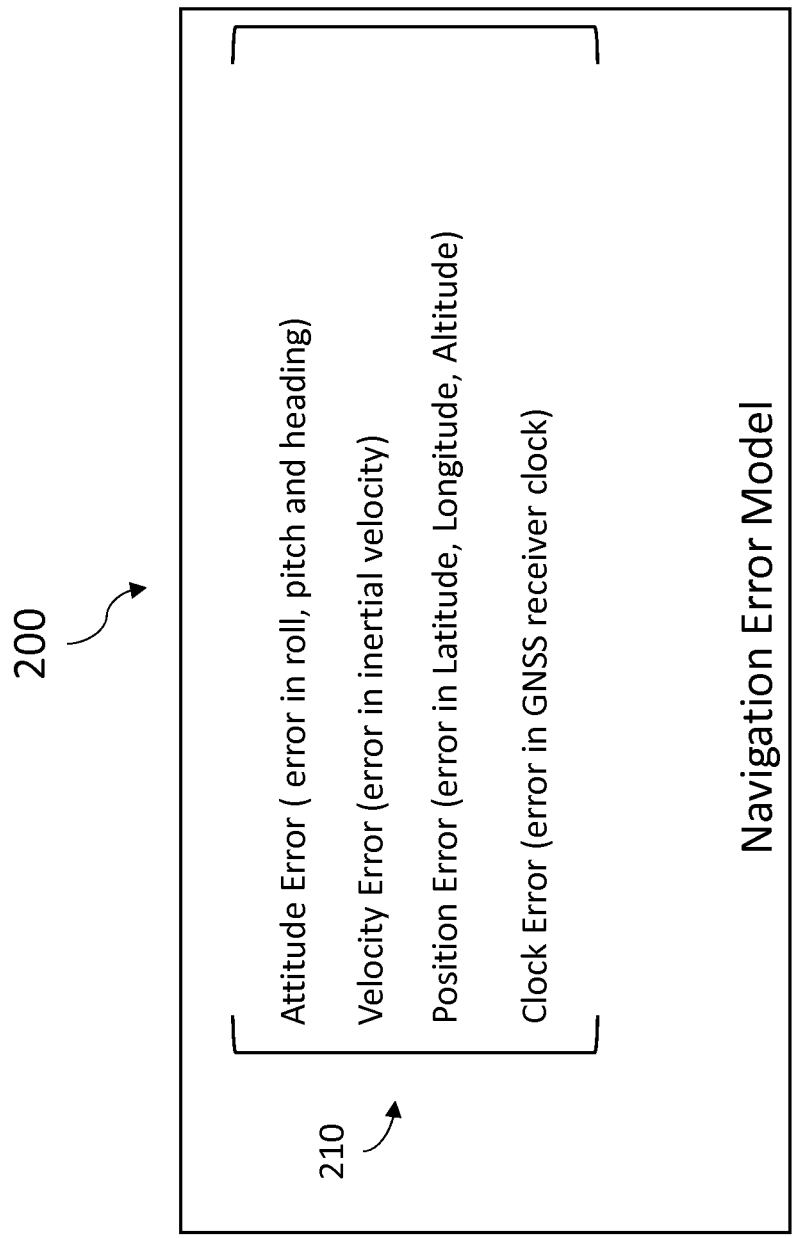
FIG. 2 is a diagram illustrating a navigation error model utilized by a sensor monitor of one embodiment of the present disclosure.

FIG. 2 is a diagram illustrating the navigation error model states 200 utilized by the hybrid filter in one of the sensor monitors 115, 125 or 135 for mathematically modeling the navigation errors (shown at 210) relevant to attitude determination. As shown in FIG. 2, errors in attitude are modeled by a first error state vector "Attitude Error". The Attitude Error comprises both pitch and roll error components. The second error state vector "Velocity Error" represents the error in the velocity provided by inertial navigation data. The third error state vector, referred to as the "Position Error" represents the error in the position provided by inertial navigation data, such as longitude, latitude and altitude errors. The fourth error state vector "Clock Error" represents the error in the clock of the GNSS receiver 160 and is needed for the processing of pseudo ranges. There may be additional states in the hybrid filter such as sensor bias errors, scale factor error etc.

Figure 3:
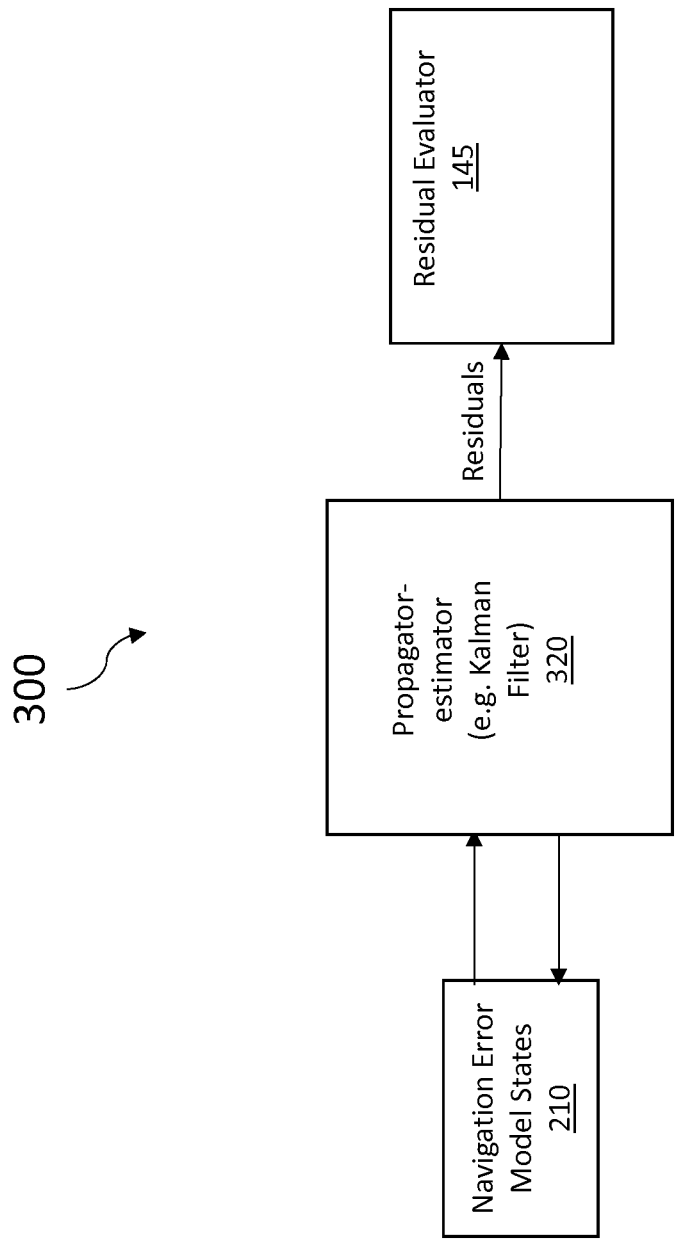
FIG. 3 is a diagram further illustrating a sensor monitor of one embodiment of the present disclosure.

FIG. 3 is a diagram further illustrating a sensor monitor 300, which may be used to implement any one of the sensor monitors 115, 125, 135 illustrated in FIG. 1. Within sensor monitor 300, the navigation error model 200 supplies error states 210 as inputs into a predictor-estimator 320, which in some embodiments may be implemented using a Kalman Filter or some variant thereof. The predictor-estimator 320 implements state predictor and state update algorithms. That is, the predictor-estimator 320 predicts what the values of a future set of the states 210 should be based on the present values of the states 210, while considering any errors that can be normally expected in that data due to noise or equipment tolerances. Predictor-estimator 320 then updates the error states based on that prediction and compares those states to the next set of GNSS data provided by receiver 160. Any differences in the measured GNSS data and the measurement predictions based on the predictor-estimator 320's updated error states represent a deviation referred to as a residual error. If the residual is small, the predictor-estimator 320 will attempt to correct for the error by applying the residual error (or at least some fraction of it) into its next iteration of predicted values of states 210. If the source of that initial residual error is consistent with the error model, then future residual errors calculated from subsequent iterations of predicted values should be smaller than the initial residual error.

However, if there is a systemic problem with the inertial data generated by the inertial measurement unit being monitored by that sensor monitor 300, and in particular the pitch or roll, large residuals will continue to occur and exceed any expected deviations that otherwise could be attributed to noise in the data and they will consequently fall outside the expected bounds of the error distribution. Accordingly, the residual outputs and their associated statistical parameters (such as mean and sigma in a normal distribution) reflecting the expected error distribution, from each of the sensor monitors 115, 125 and 135 are provided to the residual evaluator 145.

In the case where there are two in-service inertial measurement units, if the residual evaluator 145 determines that a residual error output from one of the sensor monitors (e.g. 115, 125 and 135) for those in-service inertial measurement units is beyond some predetermined statistical threshold (e.g., greater than some $K\sigma$ for a predetermined K), then there is an inconsistency relative to the error model 200 for that particular inertial measurement unit and the processed GNSS data which indicates that the inertial measurement unit providing the attitude values to that navigation model 200 may have degraded or failed. In order to discount the possibility of an error in the GNSS satellite navigation data used by navigation model 200, the residual evaluator 145 determines if residual values across the in-service inertial navigation units are similarly increasing. That is, an error in the GNSS satellite navigation data would be similarly manifested in the residuals produced from each navigation model 200 using that data. Such an increase in residuals across multiple sensor monitors would not be indicative of inertial sensor unit degradation. However, if only one of the in-service inertial navigation units experiences an increase in residual errors beyond the predetermined statistical threshold, then that does indicate that the inertial measurement unit providing the Attitude values to that navigation model 200 has degraded or failed. At that point, the residual evaluator 145 outputs a signal that generates an alert on instrument status display 150. For example, if the sensor monitor 115 for (High Grade) Inertial Measurement Unit #1 110 generates a high residual, then residual evaluator 145 outputs an alert on instrument status display 150 such as "Inertial #1 Attitude Fault". If the sensor monitor 125 for (High Grade) Inertial Measurement Unit #2 120 generates a high residual, then residual evaluator 145 outputs an alert on instrument status display 150 such as "Inertial #2 Attitude Fault". Similarly, if the sensor monitor 135 for (Low Grade) Inertial Measurement Unit #3 130 detects generates a high residual, then residual evaluator 145 outputs an alert on instrument status display 150 such as "Inertial #3 Attitude Fault". The flight crew thus become informed of the degraded condition of the faulted inertial measurement unit(s) and rely on the attitude measurements from the remaining unit for the balance of the flight. It should be noted that erroneous attitude data from either the roll or pitch component may be used as the basis to disregard all attitude data from the affected inertial measurement unit. There is also the trivial case where the fault develops during a longer time frame such that the hybrid attitude clearly differs from the pure inertial attitude with no significant impact on the measurement residuals. In that case the unit that is not consistent with itself is at fault. The embodiments described herein focus on the non-trivial case where the hybrid and pure inertial attitude are within the expected range. It is however possible to maintain the residual monitoring scheme for this case as well if the attitude is added as a measurement to the propagator-estimator and the corresponding residuals are added to the measurement residuals that are provided to the residual evaluator.

Figure 4:
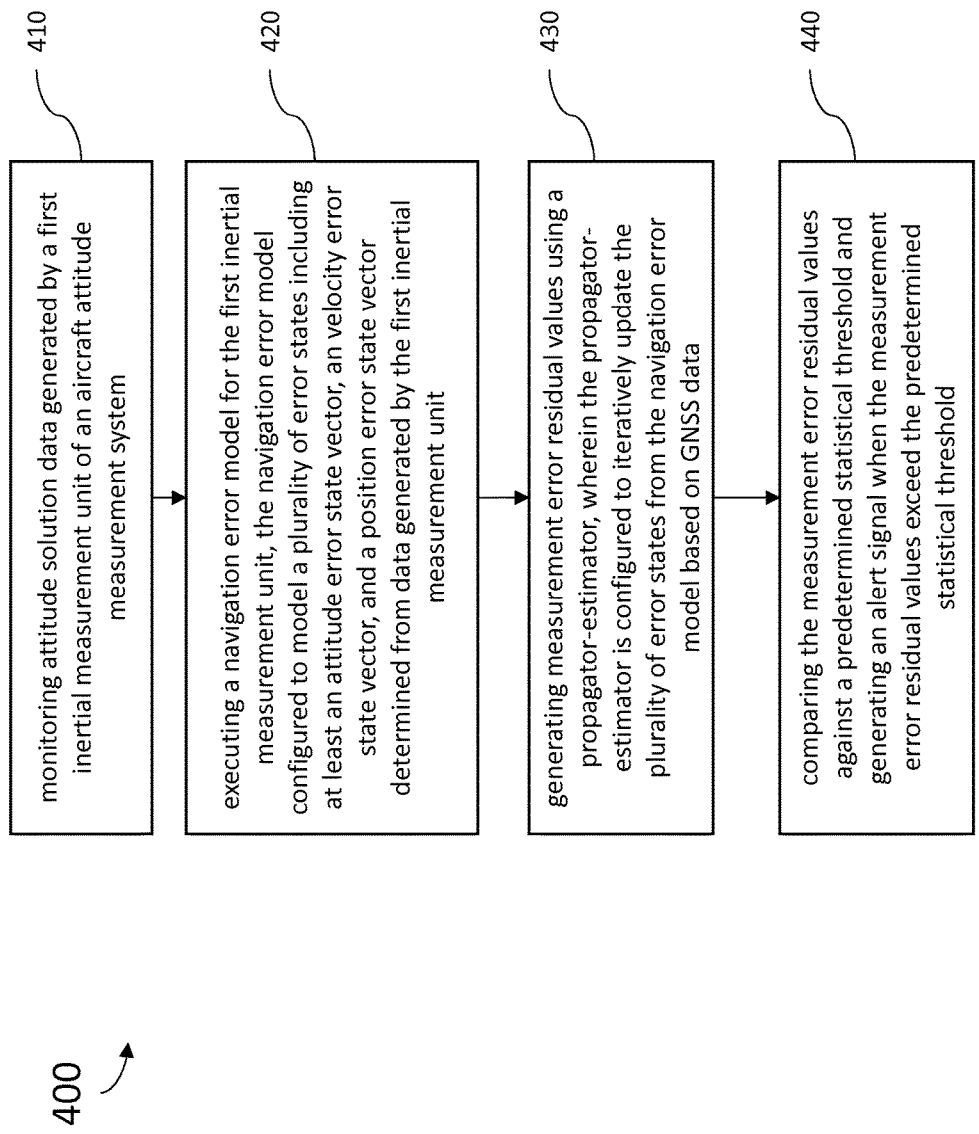
FIG. 4 is a flow chart illustrating a method of one embodiment of the present disclosure.

FIG. 4 is a diagram illustrating a method 400 of one embodiment of the present invention. In some embodiments, method 400 may be used to implement any of the embodiments described with respect to FIGS. 1 to 3. The method begins at 410 with monitoring attitude solution data generated by a first inertial measurement unit of an aircraft attitude measurement system. In one embodiment the aircraft attitude measurement system may include a set of inertial measurement units such as inertial measurement units 110, 120 and 130 shown in FIG. 1. In one embodiment the system includes a first high-grade inertial measurement unit and a second high-grade inertial measurement unit and further includes a low-grade inertial measurement unit which may be implemented using an MEMS inertial sensor, for example. However, the aircraft attitude measurement system need not be limited to this particular configuration. In other embodiments, the inertial measurement units may all be high-grade, all low-grade, all different grades, or any combination thereof. Further, in alternate embodiments, method 400 may be implemented within a system that comprises more than, or less than, 3 inertial measurement units. The inertial measurement units are each configured to output data to one or more cockpit attitude displays that provide aircraft attitude measurement information to the flight crew.

The method proceeds to 420 with executing a navigation error model for the first inertial measurement unit, the navigation error model configured to model a plurality of error states including at least an attitude error state vector, an velocity error state vector, and a position error state vector determined from data generated by the first inertial measurement unit, and to 430 with generating measurement error residual values using a propagator-estimator, wherein the propagator-estimator is configured to iteratively update the plurality of error states from the navigation error model based on GNSS data. As shown in FIG. 2, errors in attitude are modeled within the navigation error model by a first error state vector "Attitude Error". The Attitude Error comprises both pitch and roll error components. The second error state vector "Velocity Error" represents the error in the velocity provided by inertial navigation data. The third error state vector, referred to as the "Position Error" represents the error in the position provided by inertial navigation data, such as longitude, latitude and altitude errors. The fourth error state vector "Clock Error" represents the error in the clock of a GNSS receiver 160 and is needed for the processing of pseudo ranges. There may be additional states in the hybrid filter such as sensor bias errors, scale factor error etc. The propagator-estimator may be implemented using a Kalman filter. In one embodiment, a pure inertial attitude output from the first inertial measurement unit is added as a measurement to the propagator-estimator. Further, the measurement error residual values may include measurement errors for one or both of pitch measurements and roll measurements generated by the first inertial measurement unit.

The method proceeds to 440 with comparing the measurement error residual values against a predetermined statistical threshold and generating an alert signal when the measurement error residual values exceed the predetermined statistical threshold. If there is a systemic problem with the inertial data generated by the first inertial measurement unit being monitored, and in particular the pitch or roll, large residuals will occur and exceed any expected deviations that otherwise could be attributed to noise in the data. The measurement error residual values will consequently fall outside the expected bounds of the error distribution. In the case where there are two in-service inertial measurement units, if the residual error or measurement error residual values for the first inertial measurement unit is beyond some predetermined statistical threshold (e.g., greater than some $K\sigma$ for a predetermined K), then there is an inconsistency relative to the error model for that particular inertial measurement unit and the processed GNSS data which indicates that the inertial measurement unit providing the attitude values to the navigation model may have degraded or failed. In one embodiment, the alert signal produces an alert on a display that indicates that the first inertial measurement unit is faulted. In some embodiments, generating the alert signal at block 440 further comprises producing the alert signal when the measurement error residual values from the propagator-estimator associated exceed the predetermined statistical threshold but measurement error residual values from a second propagator-estimator associated with a second inertial measurement unit do not exceed the predetermined statistical threshold.

Example Embodiments

Example 1 includes a fault detection system for aircraft attitude measurement system, the fault detection system comprising: a sensor monitor coupled to a first inertial measurement unit of the aircraft attitude measurement system, the sensor monitor comprising: a navigation error model for the first inertial measurement unit, the navigation error model configured to model a plurality of error states including at least an attitude error state vector, an velocity error state vector, and a position error state vector determined from data generated by the first inertial measurement unit; and a propagator-estimator configured to propagate and update the plurality of error states from the navigation error model based on GNSS data; and a residual evaluator configured to input measurement error residual values generated by the propagator-estimator, wherein the residual evaluator outputs an alert signal when the measurement error residual values exceed a predetermined statistical threshold.

Example 2 includes fault detection system of example 1, wherein the GNSS data is either pseudo ranges, GNSS position data or GNSS velocity data.

Example 3 includes the fault detection system of any of examples 1-2, wherein the propagator-estimator is a Kalman filter.

Example 4 includes the fault detection system of any of examples 1-3, wherein a pure inertial attitude output from the first inertial measurement unit is added as a measurement to the propagator-estimator.

Example 5 includes the fault detection system of any of examples 1-4, further comprising a display; wherein the alert signal produces an alert on the display that indicates that the first inertial measurement unit is faulted.

Example 6 includes the fault detection system of any of examples 1-5, further comprising: a second sensor monitor coupled to a second inertial measurement unit of the aircraft attitude measurement system, the second sensor monitor comprising: a second navigation error model for the second inertial measurement unit, the navigation error model configured to model a plurality of error states including at least an attitude error state vector, an velocity error state vector, a position error state vector determined from data generated by the second inertial measurement unit; and a second propagator-estimator configured to propagate and update the plurality of error states from the second navigation error model based on the GNSS data.

Example 7 includes the fault detection system of example 6, wherein the residual evaluator outputs the alert signal when the residual error values from the propagator-estimator associated with the first inertial measurement unit exceed the predetermined statistical threshold but residual error values from the second propagator-estimator associated with the second inertial measurement unit do not exceed the predetermined statistical threshold.

Example 8 includes the fault detection system of any of examples 1-7, wherein the measurement error residual values include measurement errors for one or both of pitch measurements and roll measurements generated by the first inertial measurement unit.

Example 9 includes the fault detection system of any of examples 1-8, wherein the sensor monitor is integral to the first inertial measurement unit.

Example 10 includes an inertial measurement system, the system comprising: an inertial measurement unit on-board an aircraft, the inertial measurement unit configured to output attitude measurements of the aircraft; a sensor monitor coupled to the inertial measurement unit, the sensor monitor comprising: a navigation error model for the inertial measurement unit, the navigation error model configured to model a plurality of error states including at least an attitude error state vector, an velocity error state vector, and a position error state vector determined from data generated by the first inertial measurement unit; and a propagator-estimator configured to propagate and update the plurality of error states from the navigation error model based on GNSS data; and a residual evaluator configured to input measurement error residual values generated by the propagator-estimator, wherein the residual evaluator outputs an alert signal when the measurement error residual values exceed a predetermined statistical threshold.

Example 11 includes the system of example 10, further comprising a display; wherein the alert signal produces an alert on the display that indicates that the first inertial measurement unit is faulted.

Example 12 includes the system of any of examples 10-11, wherein the residual evaluator outputs the alert signal when the residual error values from the propagator-estimator associated exceed the predetermined statistical threshold but residual error values from a second propagator-estimator associated with a second inertial measurement unit do not exceed the predetermined statistical threshold.

Example 13 includes the system of any of examples 10-12, wherein the sensor monitor is integral to the inertial measurement unit.

Example 14 includes a fault detection method for an aircraft attitude measurement system, method comprising: monitoring attitude solution data generated by a first inertial measurement unit of an aircraft attitude measurement system; executing a navigation error model for the first inertial measurement unit, the navigation error model configured to model a plurality of error states including at least an attitude error state vector, an velocity error state vector, and a position error state vector determined from data generated by the first inertial measurement unit; generating measurement error residual values using a propagator-estimator, wherein the propagator-estimator is configured to iteratively update the plurality of error states from the navigation error model based on GNSS data; and comparing the measurement error residual values against a predetermined statistical threshold and generating an alert signal when the measurement error residual values exceed the predetermined statistical threshold.

Example 15 includes the method of example 14, wherein the GNSS data is either pseudo ranges, GNSS position data or GNSS velocity data.

Example 16 includes the method of any of examples 14-15, wherein the propagator-estimator is a Kalman filter.

Example 17 includes the method of any of examples 14-16, wherein a pure inertial attitude output from the first inertial measurement unit is added as a measurement to the propagator-estimator.

Example 18 includes the method of any of examples 14-17, wherein the alert signal produces an alert on a display that indicates that the first inertial measurement unit is faulted.

Example 19 includes the method of any of examples 14-18, wherein the measurement error residual values include measurement errors for one or both of pitch measurements and roll measurements generated by the first inertial measurement unit.

Example 20 includes the method of any of examples 14-19, further comprising: producing the alert signal when the measurement error residual values from the propagator-estimator associated exceed the predetermined statistical threshold but measurement error residual values from a second propagator-estimator associated with a second inertial measurement unit do not exceed the predetermined statistical threshold.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fault detection system for aircraft attitude measurement system, the fault detection system comprising:
 a sensor monitor coupled to a first inertial measurement unit of the aircraft attitude measurement system, the sensor monitor comprising:
  a navigation error model for the first inertial measurement unit, the navigation error model configured to model a plurality of error states including at least an attitude error state vector, an velocity error state vector, and a position error state vector determined from data generated by the first inertial measurement unit; and
  a propagator-estimator configured to propagate and update the plurality of error states from the navigation error model based on GNSS data; and
 a residual evaluator configured to input measurement error residual values generated by the propagator-estimator, wherein the residual evaluator outputs an alert signal when the measurement error residual values exceed a predetermined statistical threshold.

2. The fault detection system of claim 1, wherein the GNSS data is either pseudo ranges, GNSS position data or GNSS velocity data.

3. The fault detection system of claim 1, wherein the propagator-estimator is a Kalman filter.

4. The fault detection system of claim 1, wherein a pure inertial attitude output from the first inertial measurement unit is added as a measurement to the propagator-estimator.

5. The fault detection system of claim 1, further comprising a display;
 wherein the alert signal produces an alert on the display that indicates that the first inertial measurement unit is faulted.

6. The fault detection system of claim 1, further comprising:
 a second sensor monitor coupled to a second inertial measurement unit of the aircraft attitude measurement system, the second sensor monitor comprising:
  a second navigation error model for the second inertial measurement unit, the navigation error model configured to model a plurality of error states including at least an attitude error state vector, an velocity error state vector, a position error state vector determined from data generated by the second inertial measurement unit; and
  a second propagator-estimator configured to propagate and update the plurality of error states from the second navigation error model based on the GNSS data.

7. The fault detection system of claim 6, wherein the residual evaluator outputs the alert signal when the residual error values from the propagator-estimator associated with the first inertial measurement unit exceed the predetermined statistical threshold but residual error values from the second propagator-estimator associated with the second inertial measurement unit do not exceed the predetermined statistical threshold.

8. The fault detection system of claim 1, wherein the measurement error residual values include measurement errors for one or both of pitch measurements and roll measurements generated by the first inertial measurement unit.

9. The fault detection system of claim 1, wherein the sensor monitor is integral to the first inertial measurement unit.

10. An inertial measurement system, the system comprising:
 an inertial measurement unit on-board an aircraft, the inertial measurement unit configured to output attitude measurements of the aircraft;
 a sensor monitor coupled to the inertial measurement unit, the sensor monitor comprising:
  a navigation error model for the inertial measurement unit, the navigation error model configured to model a plurality of error states including at least an attitude error state vector, an velocity error state vector, and a position error state vector determined from data generated by the first inertial measurement unit; and
  a propagator-estimator configured to propagate and update the plurality of error states from the navigation error model based on GNSS data; and
 a residual evaluator configured to input measurement error residual values generated by the propagator-estimator, wherein the residual evaluator outputs an alert signal when the measurement error residual values exceed a predetermined statistical threshold.

11. The system of claim 10, further comprising a display;
 wherein the alert signal produces an alert on the display that indicates that the first inertial measurement unit is faulted.

12. The system of claim 10, wherein the residual evaluator outputs the alert signal when the residual error values from the propagator-estimator associated exceed the predetermined statistical threshold but residual error values from a second propagator-estimator associated with a second inertial measurement unit do not exceed the predetermined statistical threshold.

13. The system of claim 10, wherein the sensor monitor is integral to the inertial measurement unit.

14. A fault detection method for an aircraft attitude measurement system, method comprising:
 monitoring attitude solution data generated by a first inertial measurement unit of an aircraft attitude measurement system;
 executing a navigation error model for the first inertial measurement unit, the navigation error model configured to model a plurality of error states including at least an attitude error state vector, an velocity error state vector, and a position error state vector determined from data generated by the first inertial measurement unit;
 generating measurement error residual values using a propagator-estimator, wherein the propagator-estimator is configured to iteratively update the plurality of error states from the navigation error model based on GNSS data; and
 comparing the measurement error residual values against a predetermined statistical threshold and generating an alert signal when the measurement error residual values exceed the predetermined statistical threshold.

15. The method of claim 14, wherein the GNSS data is either pseudo ranges, GNSS position data or GNSS velocity data.

16. The method of claim 14, wherein the propagator-estimator is a Kalman filter.

17. The method of claim 14, wherein a pure inertial attitude output from the first inertial measurement unit is added as a measurement to the propagator-estimator.

18. The method of claim 14, wherein the alert signal produces an alert on a display that indicates that the first inertial measurement unit is faulted.

19. The method of claim 14, wherein the measurement error residual values include measurement errors for one or both of pitch measurements and roll measurements generated by the first inertial measurement unit.

20. The method of claim 14, further comprising:
   producing the alert signal when the measurement error residual values from the propagator-estimator exceed the predetermined statistical threshold but measurement error residual values from a second propagator-estimator associated with a second inertial measurement unit do not exceed the predetermined statistical threshold.

* * * * *